United States Patent

[11] 3,614,662

[72] Inventors Roch R. Monchamp
Waltham;
Marvin J. Weber, Wayland; Michael Bass,
Lexington, all of Mass.
[21] Appl. No. 886,617
[22] Filed Dec. 19, 1969
[45] Patented Oct. 19, 1971
[73] Assignee Raytheon Company
Lexington, Mass.

[54] LASER WITH A MONOCRYSTALLINE YAlO3:Nd$^{+3}$ ACTIVE MEDIUM
11 Claims, 1 Drawing Fig.

[52] U.S. Cl. .................................................. 331/94.5, 252/301.3, 330/7.51
[51] Int. Cl. ................................................... H01s 3/16
[50] Field of Search .......................................... 331/94.5; 252/301; 330/7.51

[56] References Cited
OTHER REFERENCES

Ohlmon, "Flourescence of $Cr^{+3}$ in $LaAlO_3$" Bull. of the Am. Physics Soc. 1964, pp. 280–1.

Ohlmon et al., " Energy Transfer from 3d to 4f Electrons in $LaAlO_3$:Cr, Nd" Phys. Rev. Lett. 13 (4) 27 Jul. 64, pp. 135–137

Burns et al., " Temperature Dependence of .... in Several Perovsketes," J. Applied Physics, vol. 37, Oct. 1966, pp. 4299–4300

Primary Examiner—William L. Sikes
Assistant Examiner—R. J. Webster
Attorneys—Harold A. Murphy and Joseph D. Pannone ABSTRACT: $Nd^{+3}$ ions serve as a dopant in monocrystalline $YAlO_3$ forming an active solid-state lasing medium.

3,614,662
PATENTED OCT 19 1971
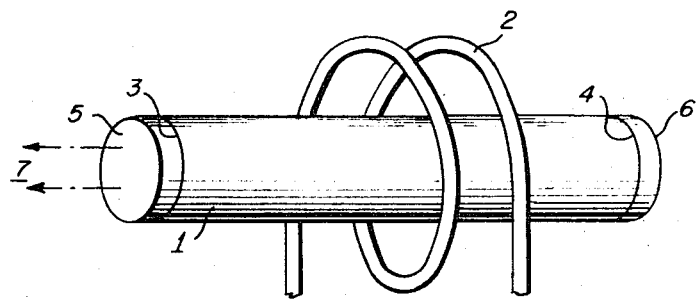
INVENTORS
ROCH V. MONCHAMP
MARVIN J. WEBER
MICHAEL BASS
BY Robert Bruce Brodie
ATTORNEY

LASER WITH A MONOCRYSTALLINE YAlO3:Nd+3 ACTIVE MEDIUM

SUMMARY OF THE INVENTION

This invention relates to fluorescent materials and devices utilizing such materials. More particularly, the invention relates to laser materials and devices generating coherent light in the infrared region, especially in the wavelength range from 0.86 microns to 1.44 microns.

It is known that trivalent neodymium is an active laser ion producing coherent light in the infrared region when suitably stimulated. $Nd^{+3}$ ions have been used as a dopant in a calcium tungstate host lattice (U.S. Pat. No. 3,225,306 to L. F. Johnson) and glass (U.S. Pat. No. 3,270,290 to R. D. Maurer). These hosts suffer many disadvantages. For example, calcium tungstate is difficult to fabricate due to its tendency to crack. Also, the tungstate crystal and glass have a low thermal conductivity which precludes their use with high average power pump sources.

Yttrium aluminum garnet (YAG), having the molecular formula $Y_3Al_5O_{12}$, is a monocrystalline laser host material found to be far more suitable for high-power pulse and CW laser operation. However, the power output of a suitably optically pumped YAG laser rod depends upon the concentration of $Nd^{+3}$ dopant, which in YAG is a maximum of $2 \times 10^{20}$ ions/cm³, consistent with high optical quality required for lasing. Exceeding this maximum normally produces bubbles, second phase precipitants, and strain in YAG.

It is, accordingly, an object of this invention to devise a material capable of fluorescing in the infrared region, especially between 0.86 to 0.94, 1.05 to 1.11, and 1.31 to 1.44 microns. Relatedly, the material should be in the solid state and capable of high power pulse and CW operation. It should be resistant both to warping and cracking. Lastly, the material should exhibit rapid crystal growth, uniformity of doping, and ease of fabrication.

It is yet another object of this invention that the host material with its $Nd^{+3}$ dopant also permits the use of a codopant to enhance the efficiency with which the lasing medium may be optically pumped.

SUMMARY

The above objects are satisfied in an embodiment in which an active laser medium is formed from monocrystalline $YAlO_3$ host lattice, a portion of whose $Y^{+3}$ ions have been replaced by $Nd^{+3}$ ions with amounts of $Cr^{+3}$ added for the optically most efficient operation. With $YAlO_3$ it is possible to replace a higher proportion of $Y^{+3}$ ions with $Nd^{+3}$ ions while still maintaining the high crystal quality suitable for laser use.

When the $YAlO_3$ crystals are grown according to the method found in copending U.S. Pat. application No. 886,932 to Roch R. Monchamp, Marvin J. Weber, and Edward M. Comperchio, entitled Single Crystal $YAlO_3$ Laser Host Material and Method for Making Same, filed on Dec. 22, 1969, then the growth rates are substantially faster than those of YAG.

The drawing is a perspective view of an infrared device utilizing compositions of the invention.

DESCRIPTION OF THE PREFERRED EMBODIMENT

Laser experiments were made using four laser rods formed from monocrystalline $YAlO_3$ doped with respectively $1.3 \times 10^{21}$, $6.9 \times 10^{20}$, $3 \times 10^{20}$, and $1.6 \times 10^{20}$ $Nd^{+3}$ ions per cm³. The rods were grown using the technique of the aforementioned copending application. These rods were typically 5 m.m. cross section diameter and length of 50 m.m. As an example, the $1.6 \times 10^{20}$ ion/cc. doped rod was formed from a boule derived from a melt of 237.076 grams of $Y_2O_3$, 108.416 grams of $Al_2O_3$, and 4.508 grams of $Nd_2O_3$. The melt was seeded with a $YAlO_3$ crystal, which seed was rotated at 20 r.p.m. and pulled out of the melt at a rate of 0.300 inches per hour. The resulting crystal boule size was 75 millimeters in length with a cross section diameter varying between 10 to 11 millimeters. The crystal exhibited a violet color. The crystal orientation was approximately 7° from one of its optic axes.

The ends of each rod were finished flat and parallel with an antireflection coating of less than 0.25 percent reflectivity in the wavelength range between 0.86 to 1.44 microns. Mirrors were used and disposed opposite the finished flat rod ends and were also coated to have the proper reflectivity in this spectral region. The mirrors were used for both the pulsed and CW test operations.

CW laser studies were performed using two 2-inch arc length, 4 millimeter bore, krypton arc lamps in a gold plated double ellipse. The $1.6 \times 10^{20}$ $Nd^{+3}$ ions/cc. doped rod produced 300 milliwatts of output at an input power of 4000 watts. Pulsed laser studies employed one 2-inch arc length, 4 millimeter bore, xenon flash lamp in a gold plated single ellipse.

The preferred lasing wavelength of these $Nd^{+3}$ doped rods was 1.0795 microns ±3 A. The emission was strongly linearly polarized in the plane of the optic axes. When a polarizer was placed within the laser cavity and rotated so that there was no feedback for the preferred polarization, then lasing was obtained with the emission polarized in the orthogonal plane and with the wavelength being shifted to 1.0645 ±3 A. It was observed that the laser remained in the preferred polarization plane and wavelength until the polarizer was rotated more than 70° away from full transmission of the preferred polarization.

Referring now to the drawing, there is shown a rod shaped crystal 1 of $YAlO_3$ having an appropriate concentration of $Nd^{+3}$ ions. Pump energy is supplied by a helical lamp 2 encompassing rod 1 and connected to an energy source not shown. Ends 3 and 4 of rod 1 are ground and polished in the form of confocal spherical surfaces. Reflective layers 5 and 6 are deposited on ends 3 and 4 thereby forming an optical cavity resonator.

Advantageously, layer 6 is totally reflecting while layer 5 includes at least a portion which is only partially reflecting to permit the escape of coherent radiation 7.

Lamp 2 is advantageously of a type which produces intense radiation of a broad band from 3,000 A to 9,000 A. Krypton or xenon lamps are considered useful to pump the material of the invention.

Although the invention has been described with reference to two specific embodiments, this is to be construed by way of illustration and does not limit the scope of the invention. For example, the material of the invention may be used with any concentration of neodymium or $Nd^{+3}$ and $Cr^{+3}$ ions compatible with good optical quality. Furthermore, the material may be used in optical cavity resonators other than the confocal type. The parallel plane resonator, as well as others, may also be employed. Other variations are also possible within the spirit of the invention.

We claim:

1. A laser comprising:
   an optical cavity having an axis;
   an active medium within the optical cavity placed along axis of said cavity comprising trivalent neodymium within the concentration range from $1 \times 10^{19}$ ions per cubic centimeter to $2 \times 10^{21}$ ions per cubic centimeter in a single crystal body of yttrium orthoaluminate; and
   a source of illumination incident upon said active medium for pumping said active medium to establish a population inversion in said medium.

2. A laser having output radiation at a wavelength in the infrared region especially in the ranges from 0.86 to 0.94, 1.05 to 1.11, and 1.31 to 1.44 microns, comprising an active medium;
   means for pumping said medium to produce a population inversion therein;
   said active medium being formed from a single crystal body of $YAlO_3$ doped with $Nd^{+3}$ ions within the concentration range from $1 \times 10^{19}$ ions per cubic centimeter to $2 \times 10^{21}$ ions per cubic centimeter; and means comprising an optical cavity having maximum reflectivity for the wavelengths in the aforementioned ranges and an axis, along which said active medium is placed for providing stimulated emission of radiation from said active medium via said cavity.

3. In a laser according to claim 2, wherein:
the active medium is in the form of a solid monocrystalline YAlO$_3$ rod whose end surfaces are optically permeable to the wavelength ranges of interest; and
the means comprising an optical cavity comprise a pair of mirrors, each mirror being disposed opposite a corresponding rod end surface.

4. A laser comprising:
an active medium consisting essentially of monocrystalline YAlO$_3$ host lattice in which a portion of the Y$^{+3}$ ions have been replaced by Nd$^{+3}$ ions, the portion of the Y$^{+3}$ ions so replaced being less than $2 \times 10^{21}$ ions per cubic centimeter;
means for producing population inversion between a pair of optically connected energy levels of said Nd$^{+3}$ ions; and
means for stimulating coherent emission in the wavelength corresponding to the energy separation levels.

5. An active medium according to claim 4, in which the host lattice includes Cr$^{+3}$ codopant ions.

6. An active medium according to claim 4, wherein the active medium comprises a YAlO$_3$ monocrystalline rod whose end faces are reflectively coated, thus forming an optical cavity.

7. A laser comprising:
an optical cavity having an axis
a lasing medium within and along the axis of said optical cavity comprising trivalent neodymium in a single crystal yttrium orthoaluminate host; and
a source of illumination incident upon said lasing medium to produce a population inversion in said medium for pumping said lasing medium.

8. A laser amplifier comprising:
a single anisotropic orthorhombic crystal comprising yttrium orthoaluminate and trivalent ions of neodymium substituted at at least some of the lattice sites therein; and
means for pumping said crystal to produce a population inversion therein.

9. A laser comprising:
an active lasing medium comprising trivalent neodymium ions in a single crystal yttrium orthoaluminate host; and
means for pumping said active lasing medium to produce a population inversion therein.

10. A laser in accordance with claim 9 wherein said active lasing medium further includes trivalent chromium ions.

11. A laser having output radiation at a wavelength in the infrared region especially in the ranges from 0.86 to 0.94, 1.05 to 1.11, and 1.31 to 1.44 microns, which laser comprises:
an active medium comprising trivalent neodymium within the concentration range from $1 \times 10^{19}$ ions per cubic centimeter to $2 \times 10^{21}$ ions per cubic centimeter in a single crystal body of yttrium orthoaluminate;
means for pumping said active medium to produce a population inversion therein; and
means comprising an optical cavity having maximum reflectivity for the wavelengths in the aforementioned ranges and an axis, along which said active medium is placed for providing stimulated emission of radiation from said active medium via said cavity.

UNITED STATES PATENT OFFICE
CERTIFICATE OF CORRECTION

Patent No. 3,614,662          Dated October 19, 1971

Inventor(s) Roch R. Monchamp, Marvin J. Weber, Michael Bass

It is certified that error appears in the above-identified patent and that said Letters Patent are hereby corrected as shown below:

In the title, change "YAlO3:Nd$^{+3}$" to -- YAlO$_3$:Nd$^{+3}$ --

Column 1, line 67, after "copending" insert -- U.S. --

Column 2, Claim 1, line 56, after "along" insert -- the optical --

Column 3, Claim 7, line 30, after "axis" insert -- ; --

Column 4, Claim 7, lines 2 to 4, change "a source of illumination incident upon said lasing medium to produce a population inversion in said medium for pumping said lasing medium." to -- a source of illumination incident upon said lasing medium for pumping said lasing medium to produce a population in said medium. --

Signed and sealed this 27th day of June 1972.

(SEAL)
Attest:

EDWARD M. FLETCHER, JR.
Attesting Officer

ROBERT GOTTSCHALK
Commissioner of Patents